United States Patent [19]

Bouteille et al.

[11] 4,347,864

[45] Sep. 7, 1982

[54] AUXILIARY CONTROL DEVICE FOR PNEUMATIC DISTRIBUTOR

[75] Inventors: Daniel Bouteille, Ville D'Avray; Michel Nicolas, Plaisir; Pierre Prudhomme, Saint Germain en Laye, all of France

[73] Assignee: La Telemecanique Electrique, France

[21] Appl. No.: 254,802

[22] Filed: Apr. 15, 1981

Related U.S. Application Data

[63] Continuation of Ser. No. 50,856, Jun. 21, 1979, abandoned.

[30] Foreign Application Priority Data

Jun. 21, 1978 [FR] France .............................. 78 18518

[51] Int. Cl.³ ............................................. F16K 31/11
[52] U.S. Cl. ................................ 137/269; 137/625.64; 251/130
[58] Field of Search ..................... 137/625.27, 625.64, 137/625.65, 625.6, 269, 271; 251/14, 130

[56] References Cited

U.S. PATENT DOCUMENTS

| 3,270,776 | 9/1966 | Carls | 137/625.64 |
| 3,707,992 | 1/1973 | Ellison | 137/625.65 |
| 3,814,133 | 6/1974 | Veb | 137/625.65 |
| 4,023,593 | 5/1977 | Piccardo | 137/625.64 |

Primary Examiner—Alan Cohan
Attorney, Agent, or Firm—William A. Drucker

[57] ABSTRACT

In an auxiliary control device for a pneumatic distributor the improvement is the integration, in a housing of the body of the distributor closed by a stopper, of a commutator sub-assembly placed on each control channel, thereby making it possible to obtain its actuation by a manual handle, by an electromagnet or by a pneumatic actuator, without necessitating the manipulation of delicate elements.

4 Claims, 6 Drawing Figures

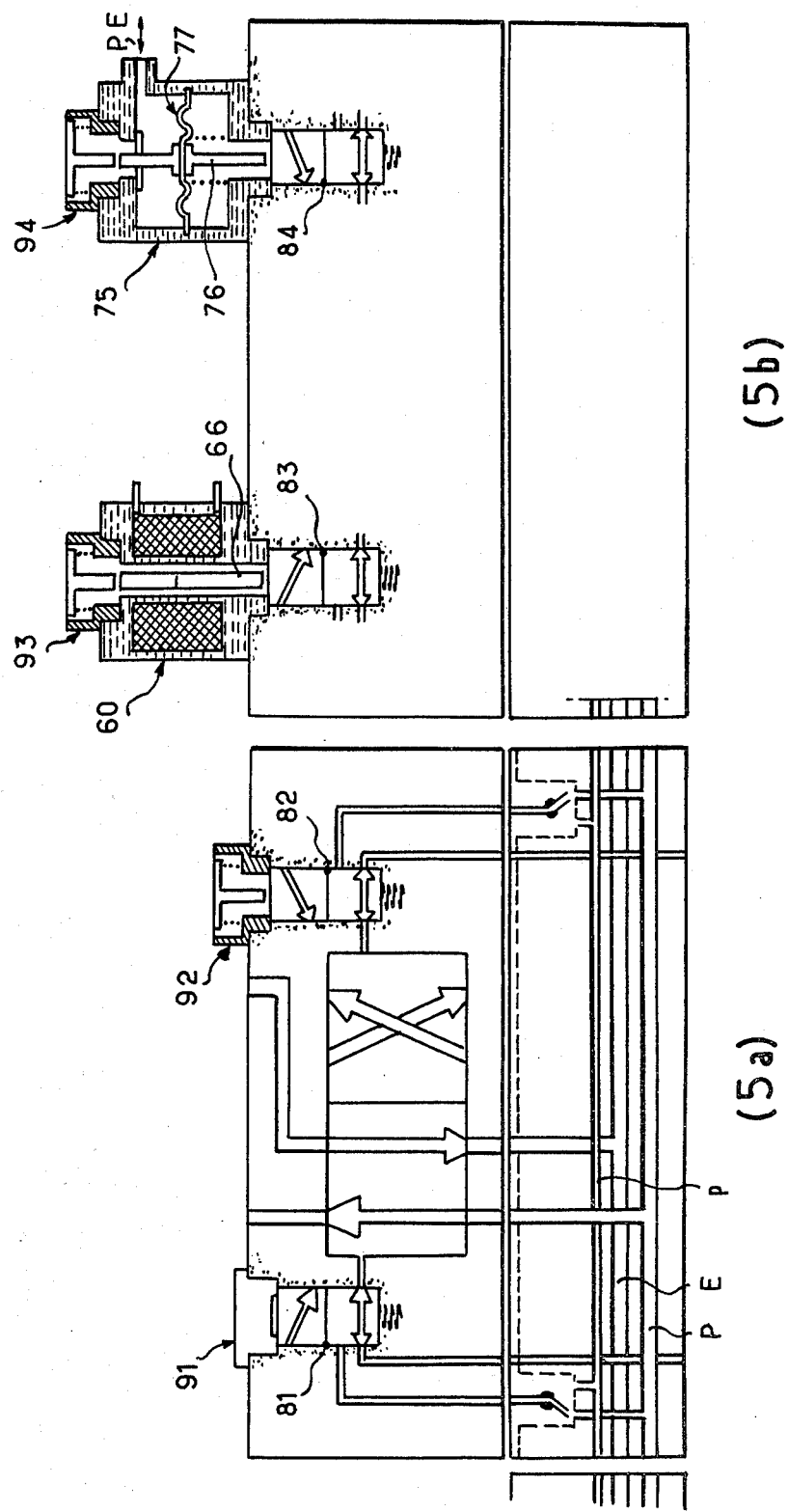

AUXILIARY CONTROL DEVICE FOR PNEUMATIC DISTRIBUTOR

This is a continuation of Ser. No. 50,856 filed June 21, 1979, now abandoned.

BACKGROUND OF THE INVENTION

The invention relates to an auxiliary control device for a pneumatic distributor having two states in which each channel for control of state can be fed with pressure, either through a channel for transmission of pneumatic signals issuing from the installation, or by a permanent pressure delivered by a pilot device for external operation manually or electrically and which, in a first rest position, couples the said control channel to the transmission channel and which, in a second active position, couples the said control channel to a conduit having permanent pressure.

THE PRIOR ART

Such a device which can be applied to the majority of distributors in pneumatic systems is known for example from French Pat. No. 2353001.

In this known device there is used a valve which carries out the commutation of fluid and which is fast with an actuating rod subjected to the return force of a spring; this force which should be sufficiently large to overcome the forces of friction of a fluid sealing joint, can readily be counterbalanced by the force of the operator's hand, but nevertheless achieves values such that the control of the rod by an electromagnet of conventional nature and of low consumption is in practice excluded; moreover, the use of a manual auxiliary control or of an electrical auxiliary control necessitates a mechanical arrangement for terminating the outlet of one of two distinct channels.

There are likewise known auxiliary control devices for distributors making use of a removable pilot electro-valve, in which the said electro-valve is coupled to channels placed in parallel to those which provide the normal control by pneumatic means and in which the said parallel channels terminate at the surface of the body of the distributor; these devices necessitate therefore either the use of a closing plate to close the orifices of the parallel channels when any electrical auxiliary control is not used, or the putting into operation in a systematic manner of an external pilot valve between the body of the distributor and the electromagnet, in the case of an electrical auxiliary control; wnen it is desired in these two cases to have a manual auxiliary control, this is carried out either by a mechanical action acting directly on the valves or on the actuating member of the distributor, which destroys the homogeneity of the control of the distributor, and modifies, as a result, its dynamic behaviour, or by the systematic incorporation of a supplementary pilot valve for manual actuation placed in parallel with the valve submitted to the action of the electromagnet, as is illustrated in USA Pat. No. 3,540,480.

Finally it is known, for example from the Swiss Pat. No. 584861 to have an electro-valve capable of being fixed on a distributor and comprising a commutation sub-assembly and an actuation sub-assembly; in this apparatus, wherein the two sub-assemblies are joined in permanent manner, the putting into operation of a manual control would necessitate the use of a second commutation sub-assembly which, by reason of its constitution, could only be actuated by a tractive operating member, the manipulation of which would be extremely difficult.

OBJECT OF THE INVENTION

The invention accordingly proposes to provide a removable auxiliary control device for a pneumatic distributor having conventional pneumatic control which, on the one hand, calls for a single same auxiliary pilot device, capable of being changed over by a mechanically actuated member related either to a pusher element for manual control, or to a pusher element for electrical control utilising an electromagnet of small bulk and consumption, or again a pusher element for electrical control which can furthermore be actuated manually, or relating, finally, to a pneumatic actuator and which, on the other hand, permits the establishment of a purely mechanical separation and coupling between the fixed parts and the movable parts so as to avoid the sensitive pneumatic elements being exposed to deterioration in the course of assembly or storage.

SUMMARY OF THE INVENTION

According to the invention the result sought is achieved by the fact that this pilot member is constituted on the one hand by a commutation sub-assembly which comprises a valve, adapted to close an orifice fed with the feed pressure under the action of a first return spring and which has an actuating tumbler for lifting the said valve, the commutation sub-assembly being disposed at the bottom of a cylindrical housing of the distributor body into which there open at different levels the channels and the conduit, and on the other hand, by a removable stopper which closes in fluid tight manner an upper part of the said housing terminating at the surface of the body, and which comprises an actuating button-pusher element the movable rod of which, sliding in fluid-tight manner, is disposed opposite the said tumbler and is submitted to the action of a second return spring giving it a rest position in which the rod does not exert any action on the tumbler, said upper part being furthermore adapted to receive either the said stopper, or an auxiliary actuating device likewise having an actuating pusher element.

BRIEF DESCRIPTION OF THE DRAWINGS

Further characteristics and features of the invention will appear more clearly from the description below, which is accompanied by the drawings, wherein:

FIGS. 5a and 5b show schematically the various combinations of auxiliary actuating devices in accordance with the invention.

Figure 4:
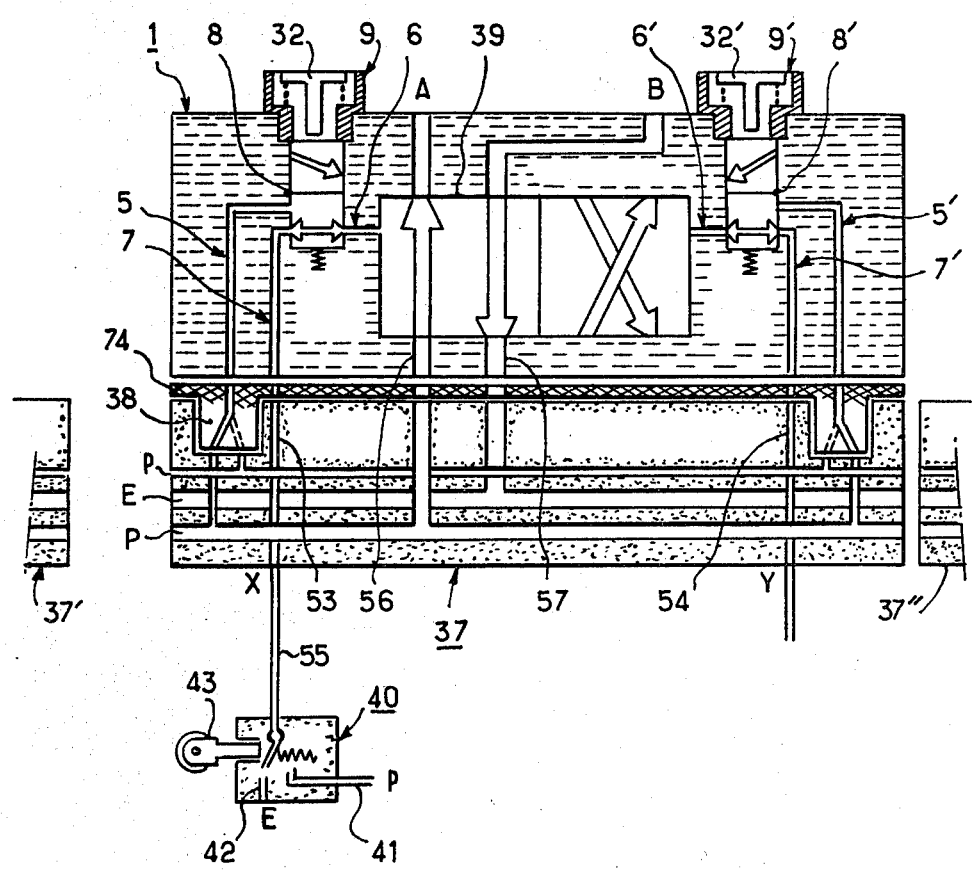
FIG. 4 shows schematically the circuits of a distributor constituted by a distributor body and by a base.

A distribution assembly, intended for example for the operation of a ram, and of which the operating principle is visible in FIG. 4, comprises principally a base 37 intended to be fixed permanently on a support, and to be associated by lateral contact with a series of identical bases such as 37′,37″, and a distributor body 1.

The base contains the channels $P, p, E$ which pass through it and which respectively transmit the feed pressure of force P intended for the ram, an auxiliary feed pressure p, and pass the exhausts E towards the neighbouring bases.

Furthermore, two channels 53,54 of this base terminate respectively at two orifices for entry of pneumatic signals X,Y; these orifices are generally coupled by flexible conduits such as 55 to generators of end of stroke signals, or position signals, such as 40 which are, for their part, fed at 41 by a permanent pressure and couple the conductor 55 either to the said permanent pressure, or to an exhaust 42.

The body of the distributor 1 which is associated in removable manner with the base, comprises a distribution member 39 which can be constructed in known manner with the aid of a slide or valves and which delivers an outlet pressure at A or B according to which one of its control channels 6,6' has received a fluid pressure; this distribution member is coupled through the channels 56,57 to the pressure P and to the exhaust E of the base; furthermore, a pneumatic inverter 8,9 or 8',9', fast with the body 1, permits the coupling of each control channel 6,6' either to a transmission channel 7 or 7', or to a pressure conduit 5 or 5' when a pusher element 32 or 32' is actuated from the exterior.

The transmission channel 7 is coupled directly to the channel 53 and thus to the pneumatic signals X, whilst the conduit 5 is coupled to a selector 38 which permits feeding thereof by one of the pressures P or $p$.

This selector is advantageously constituted by a portion of a sealing joint 74, which is placed between the base and the body, and the position of which can be altered at will.

The distribution member can thus be subjected to an order provided in the form of a pressure coming either from the interruptor 40, or from the pressure P, of from the pressure $p$ by means of the pressure commutator 8,9.

Figure 1:
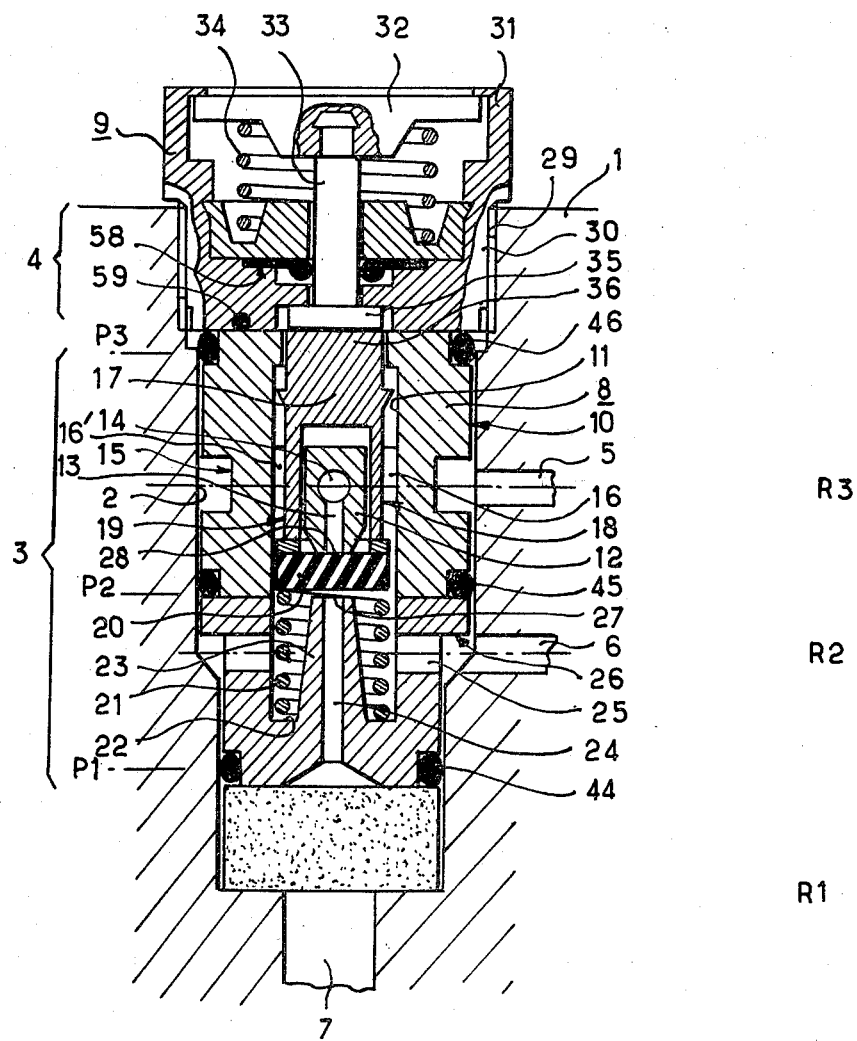
FIG. 1 represents a view in section of the device in its version for manual control.

The body 1 of the distributor, visible in FIG. 1, has for each control channel a cylindrical opening 2 placed at the side opposite to the base and comprising an upper part 4 and a base 3 into which open respectively at the levels $R_1, R_2, R_3$ the channel 7 for transmission of pneumatic signals X issuing from the installation (for example end of stroke 40), the control channel 6, and the permanent pressure conduit 5.

The auxiliary control device comprises, in its exclusively manual version, a commutation sub-assembly 8 placed in the said base 3 and a stopper 9 placed at the upper part 4.

The commutation sub-assembly 8 is formed by a body 10 of generally cylindrical shape, having an internal chamber 11, opening from the opposite side to the base and in which are disposed two orifices 28,27 which are opposed to each other and which are separated by a gap permitting a valve 20 to place itself against one or the other of them.

The valve is subjected to the resilient force of a spring 21 which by bearing on a wall 22 of the chamber tends to press it against the orifice 28 which is coupled by the channels 13 and 14 to an external throat 15 of the body 10; this throat is placed opposite to the pressure conduit 5, and is thus fed by this latter.

The channels 13,14 are carried by a cross-piece 12 placed diametrically in the chamber 11 in such a manner as to leave between it and the surface of this chamber two passages 16,16' which are traversed by the legs 18,19 of a tumbler 17 movable in the said chamber.

The chamber is furthermore coupled by a channel 15 to an external recess 26 placed opposite to the control channel 6, whilst an orifice 27 is coupled by a channel 24, formed in a column 23 carried by the wall 22 of the chamber, to the transmission channel 7 which is placed at a level $R_1$ in the housing 2.

Fluid sealing devices such as annular recesses or toroidal joints 44,45,46 are disposed at the levels $P_1, P_2, P_3$ between the channels and respectively between the conduit and the upper part 4 of the housing in order to ensure pneumatic isolation between these latter and the exterior.

The stopper 9 is constituted essentially by a cylindrical element having an external collar 31 and a threaded portion 30, this latter being threaded into the threaded region 29 of the upper part 4 of the housing, and by an actuating device comprising an external push button 32, placed in the collar, and a movable rod 33 the extremity 35 of which is placed opposite to the surface of the extremity 36 of the tubular 17.

A first sealing joint 58 assures the fluid tight displacement of the rod 33 which is caused, either by a manual action on the push button, or by a resilient force of the return spring 34 which gives it a rest position in which the extremity 35 does not exert any force on the tumbler 17.

In the pushing in movement of the push button, the rod 33 transmits its movement to the tumbler, the legs 18,19 of which in their turn separate the valve 20 from the orifice 28 in order to press it against the opposed orifice 27.

A second sealing joint 59 placed between the stopper and the commutation sub-assembly ensures, for this first position, that the pressure issuing from the channel 5 cannot escape towards the exterior through the threaded portion 29.

Figure 2:
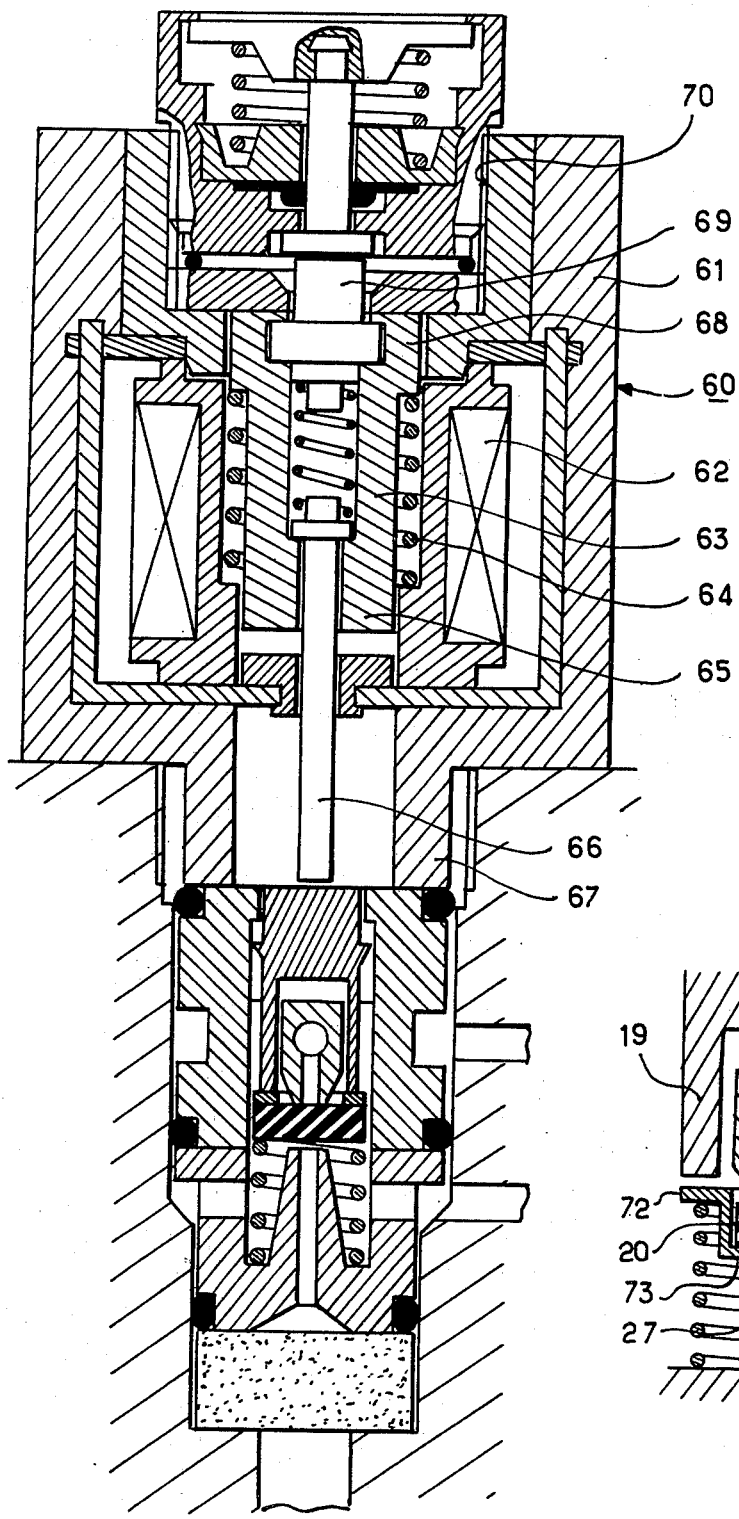
FIG. 2 illustrates a view in section of the device in its version for electrical control.

In its method use with electrical control, the auxiliary control device, which is seen in FIG. 2, calls for the same housing 2, for the same commutation sub-assembly 8, and for the same stopper 9, but receives an electromagnet 60 the body of which 61 houses essentially a winding 62 and a movable core 63 returned to its rest position by a spring 64.

The movable core is associated at one of its ends 65 with a pusher element 66 for the transmission of the movement, which passes into a projecting extension 67 of the body and the dimensions of which permit its introduction into the upper part 4 of the housing, whilst the opposite extremity 68 of the core comprises an element 69 external to the winding which is placed projecting into a recess 70 of the body and the shape of which is identical to that of the upper part 4 of the housing.

The putting into place of the electromagnet is carried out first of all by the preliminary withdrawal of the stopper seen in FIG. 1, then by the putting into positon of the extension 67 in the upper part 4 of the body, and finally by screwing the stopper 9 into the recess 70, as can likewise be seen in FIG. 5.

The body of the electromagnet is secured on the body 1 of the distributor by fixing members not shown. When the assembly of elements described above is mounted, the excitation of the electromagnet causes a displacement towards the base of the elements 63 and 66 in the course of which the latter cause displacement of the tumbler 17.

The presence of the stopper on the electromagnet moreover permits a supplementary manual action, and does not require the construction of a system for fluid tight guiding of the member 69.

When there is used an electromagnet fed with alternating current, it is essential to ensure the application of the movable core on a piece forming a part of the fixed magnetic circuit; this condition must be assured independently of the inevitable mounting tolerances which result from placing together of independent pieces.

Figure 3:
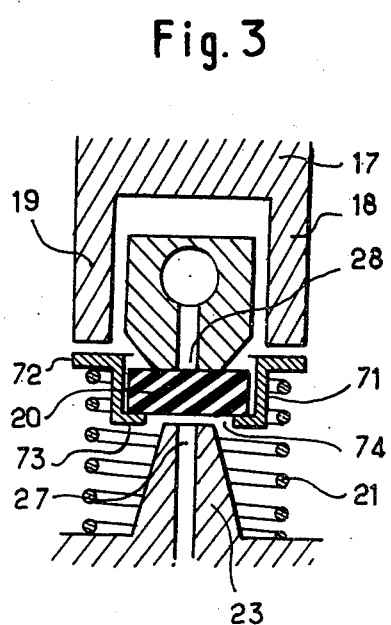
FIG. 3 shows a detail of construction of the valve and of the members which are associated with it.

In order to satisfy the condition mentioned above, it is possible to construct the mounting of the valve in accordance with the example illustrated in FIG. 3, where it will be noted that this valve 20 is placed with some lateral play in a cup 71 the periphery 72 of which is subjected to the action of the return spring 21 placed opposite to the legs 18 and 19 of the tumbler 17; this valve is pressed on the orifice 28 by the annular portion 73 of this cup the opening 74 of which is larger than the diameter of the column 23 carrying the orifice 27 at its top.

As a result, the displacement of the tumbler and thus that of the movable core, can extend beyond the stroke which is strictly necessary for the displacement of the valve.

The multiplicity of combinations which the use, of the device which has just been described, can give rise to is visible in FIG. 5, wherein the members described precedingly carry the same references; there will thus be found in each housing a commutation sub-assembly 81,82,83,84 at the level of each control channel of the distributor.

In FIG. 5a, the body of the distributor has received in its left hand housing (for a type of use where a manual operation is forbidden) a sealing button 91, whilst its right hand housing has received a push button 92 permitting the manual operation.

In FIG. 5b, the body 1 of the distributor has received in its left hand housing an electromagnet 60, on the upper part of which is placed the push button 93 for manual operation, whilst its right hand housing has received a pneumatic order transmitter 75 comprising a pusher element 76 coupled to a membrane 77 and capable of being displaced at the time of the application of a pressure or at the time of the manual operation of the push button 94.

We claim:

1. In a pneumatic control system comprising a distributor and an external pilot switch having an output, a first input, a source of permanent pressure connected to the said first input, a second input connected to an exhaust pressure and actuating means for connecting said output to said first or second inputs, a pneumatic distributor comprising:
    (a) a body having a first face and a second face;
    (b) a two-state valve received in said body, having a permanent pressure input and an exhaust opening both on said first face, two cylinder outputs and at least one control input;
    (c) at least a cylindrical housing located in said body, said housing having a first threaded inner surface portion opening on said second face, and a second inner surface portion opposite to said first inner portion;
    (d) a first feeding channel having a first end opening on said first face and a second end opening on said second inner surface portion at a first distance from said second face, said first end being normally connected to the output of said external pilot switch for receiving external pneumatic control signals;
    (e) a second feeding channel having a first end opening on said first face and a second end opening on said second inner surface portion at a second distance from said second face, said first end being adapted to receive a permanent pressure;
    (f) a control channel having a first end connected to said control input and a second end opening in said second inner surface portion at a third distance from said second face;
    (g) a pneumatic commutation sub-assembly comprising a hollow body having an outer surface and a transverse face, said outer surface being provided with a pilot orifice, with a first feeding orifice and with a second feeding orifice, a valve located in said hollow body and movable between a first position wherein said pilot orifice is connected to said first feeding orifice and a second position wherein said pilot orifice is connected to said second feeding orifice;
    (h) resilient means located in said sub-assembly body and adapted to place said valve in its first position;
    (i) a movable tumbler located in said hollow body, having an actuating end located in the vicinity of said transverse face and an opposition end remote from said transverse face, said opposite end cooperating with said valve for displacing it from its first position to its second position when said actuating end is depressed;
    (j) said sub-assembly being so inserted in said second inner surface portion that said first orifice, said second orifice and said pilot orifice register and form a tight joint, respectively with the second ends of said first feeding channel, said second feeding channel and said control channel;
    (k) a removable stopper having an outer transverse surface portion, a cylindrical threaded outer surface portion, a transverse end face opposite to said outer transverse surface portion, a cylindrical bore longitudinally extending between said outer transverse surface portion and said transverse end face, and a cylindrical pusher located in said bore, said pusher having an outer end, an intermediate outer surface portion adapted to slide in said bore in a tight manner and an inner end opposite to said outer end;
    (l) said cylindrical threaded outer surface portion of the stopper being so associated with said first threaded inner surface portion of the cylindrical housing that said transverse end face of the stopper tightly closes said second inner surface portion of the cylindrical housing and that said inner end of the pusher cooperates with said actuating end of the tumbler when said outer end of the pusher is depressed.

2. A pneumatic distributor as claimed in claim 1, said pneumatic distributor further comprising a base removably attached to the said first face and having exhaust and permanent pressure channels running therethrough in a direction substantially parallel to the said first face and opening at first and second opposite faces substantially perpendicular to the said direction, said base further having a transmission channel running therethrough and adapted for connection between an external source of control signals and the said second feeding channel.

3. A pneumatic distributor comprising:
    (a) a body having a first face and a second face;
    (b) a two-state valve received in said body having a permanent pressure input and an exhaust opening

8 said first face, two cylinder output and at least, one control input;
(c) at least a cylindrical housing located in said body, said housing having a first threaded inner surface portion opening on said second face, and a second inner surface portion opposite to said first inner surface portion;
(d) a first feeding channel having a first end opening on said first face and a second end opening on said second inner surface portion at a first distance from said second face, said first end being adapted to receive external pneumatic control signals;
(e) a second feeding channel having a first end opening on said first face and a second end opening on said second inner surface portion at a second distance from said second face, said first end being adapted to receive a permanent pn...
(f) a control channel h...
said movable core having an outer end and inner end and a bore running therethrough from the outer end to the inner end;
(m) a further pusher mounted in said bore for displacement with the said movable core and projecting from the inner end of the movable core through the said projecting extension, for cooperation with the said actuating end of the tumbler;
(n) and means, coupling the inner end of the pusher of said stopper to the outer end of said movable core, for transmitting movement of said pusher to said movable core, the said recess and that part of cylindrical housing which is deli...
first threaded inn...

4. In...

form a tight joint, respectively with the second ends of said first feeding channel, said second feeding channel and said control channel;
(k) a removable stopper having an outer transverse surface portion, a cylindrical threaded outer surface portion, a transverse end face opposite to said outer transverse surface portion, a cylindrical bore longitudinally extending between said outer transverse surface portion and said transverse end face, and a cylindrical pusher located in said bore, said pusher having an outer end, an intermediate outer surface portion adapted to slide in said bore in a tight manner and inner end opposite to said outer end;
(l) an electromagnet having a hollow body comprising an outer end and intermediate portion and an inner end, said outer end having a recess into which the said threaded cylindrical surface portion of the stopper is screwed and said inner end having a projecting extension which projects into the first threaded inner surface portion of the said cylindrical housing and abuts against the said transverse face of the said commutation sub-assembly, a winding lodged in the intermediate portion of said hollow body and a movable core in said winding; said movable core having an outer end and inner end and a bore running therethrough from the outer end of the inner end;
(m) a further pusher mounted in said bore for displacement with the said movable core and projecting from the inner end of the movable core through the said projecting extension, for cooperation with the said actuating end of the tumbler;
(n) and means, coupling the inner end of the pusher of said stopper to the outer end of said movable core, for transmitting movement of said pusher to said movable core, the said recess and that part of the cylindrical housing which is delimited by the said first threaded inner surface portion being identical.

* * * * *